Patented June 27, 1939

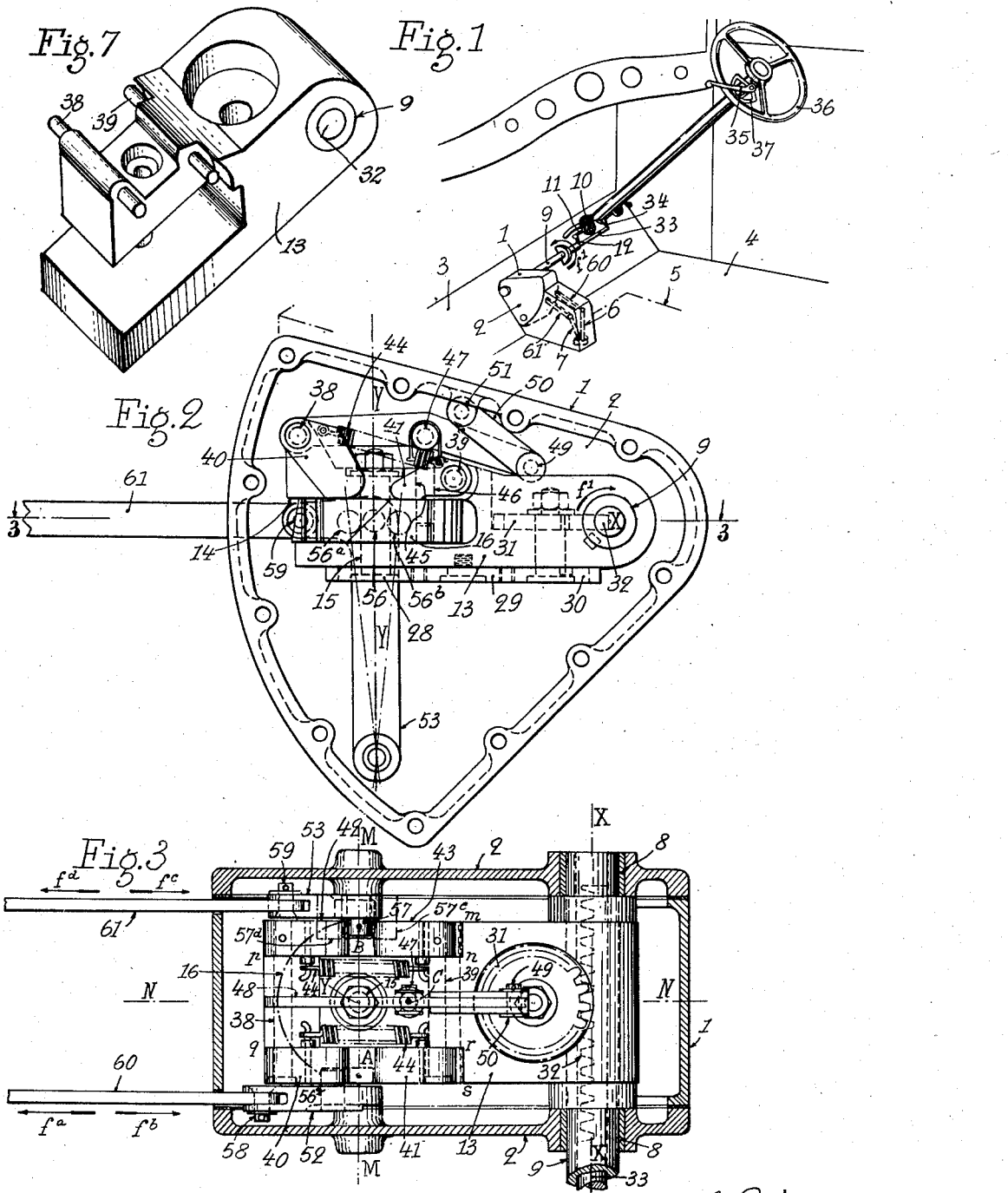

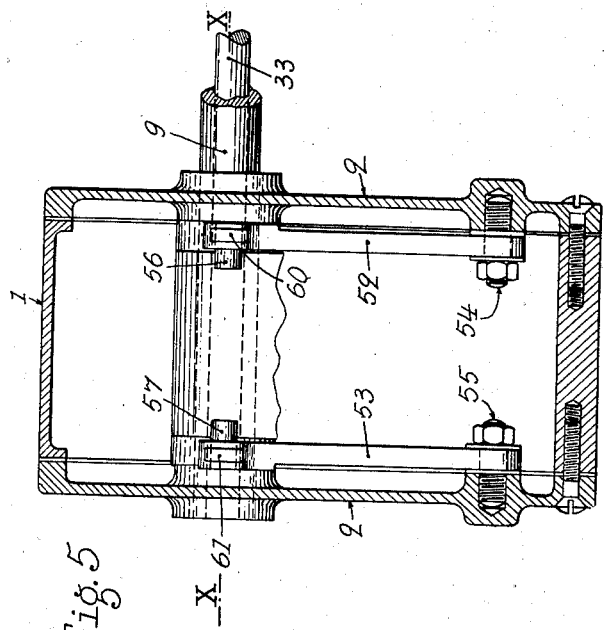
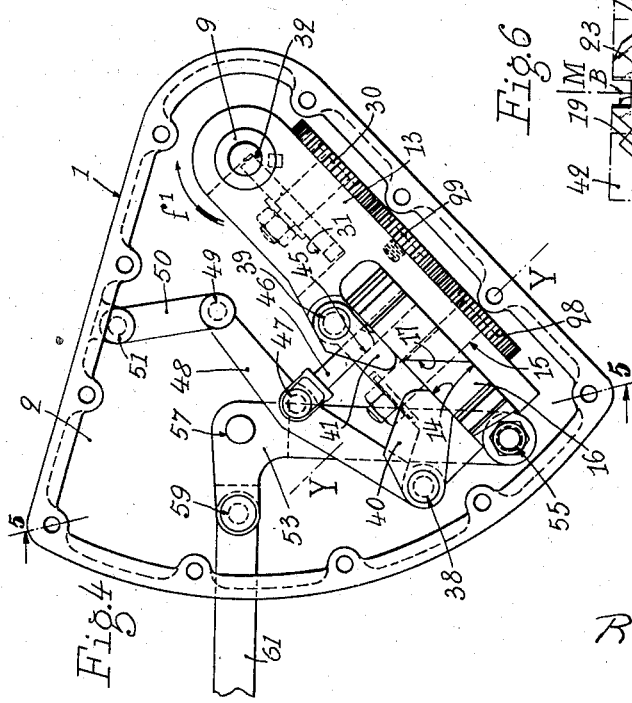
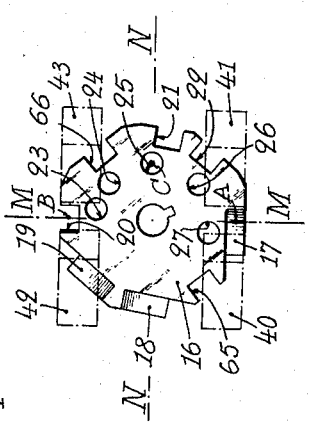

2,163,975

UNITED STATES PATENT OFFICE 2,163,975

CONTROL MECHANISM FOR CHANGE-SPEED GEARS OF MOTOR VEHICLES AND THE LIKE

Robert Louis Delmas, Paris, France

Application May 3, 1937, Serial No. 140,552
In France May 25, 1936

6 Claims. (Cl. 74—334)

Various speed-changing mechanisms are known which are provided with a selecting device adapted to prepare, in advance, for the speed-changing operation, this operation being then performed at the desired time by a simple movement, such as pressing a button, drawing a rod, or the like. These mechanisms are combined, in a single unit, with the change-speed box, and the whole apparatus is usually quite expensive.

The present invention has for its object to provide a control mechanism for change-speed gears of motor vehicles and the like, which is very simple in its construction and its operation and forms a separate assemblage which may be combined with any of the known change-speed boxes.

The invention will now be described with reference to the accompanying drawings, which are given solely by way of example, and in which:

Fig. 1 is a diagrammatic perspective view of the lower front part of the interior of a motor vehicle showing the mechanism according to the invention, which is connected with the change-speed gear, with the clutch pedal, and with an operating handle, mounted on the steering wheel.

Fig. 2 is an elevational view of the mechanism in the position corresponding to the changing over of the speeds, after unclutching, one of the side covers of the casing of the mechanism being removed.

Fig. 3 is a plan view corresponding to Fig. 2, the casing of the mechanism being shown in section on the line 3—3 of Fig. 2.

Fig. 4 is a view similar to Fig. 2, the mechanism being shown at the end of a selecting operation, and before clutching.

Fig. 5 is a vertical section on the line 5—5 of Fig. 4, with the selecting device and its support removed.

Fig. 6 is a plan view of the selecting member.

In the embodiment herein represented, the device comprises a casing 1 which is closed by two lateral covers 2 and is adapted to be secured for instance upon the inclined front part 3 of the floor of a vehicle 4 (Fig. 1), in front of the change-speed gear to be controlled. The said gear is mounted at 5 below the floor 4, from which extend upwardly two levers 6 and 7 acting for instance, directly or indirectly, upon two sliding gears corresponding respectively: for the lever 6, to the first speed and reverse drive; for the lever 7, to the second and third speeds.

In the lateral covers 2 of the casing 1 is rotatable a tubular shaft 9, in smooth bearings 8 (Fig. 3) or in ball bearings. The said shaft is connected, outside the casing, to the usual clutch pedal 10 (Fig. 1) by any suitable means, for instance by a link 11 and crank 12, so that the said shaft will be turned in the direction of the arrow $f^1$ (Figs. 1, 2, and 4) when pressing down the clutch pedal 10.

To the tubular shaft 9, whose axis is XX, is keyed a support member 13 (Figs. 2 to 4) which may pivot between the idle position shown in Fig. 4, and the position corresponding to the changing over of the speeds shown in Figs. 2 and 3 when the pedal 10 passes from its idle position (clutched position) to its position at the end of the unclutching stroke. The said support member is cut out at its free end in order to form a sort of fork 14, the upper portion of which has in plan view a rectangular shape, mnpqrs (Fig. 3). In the said fork is pivoted, on an axle 15, a rotatable member or wheel 16, which forms the selecting member. On the periphery of the said wheel are provided three slopes 17, 18, 19 (Fig. 6), three notches 20, 21, 22 which are diametrically opposite the respective slopes, and two dead centre notches 65, 66. The said wheel is pierced with five holes 23, 24, 25, 26, 27, so arranged that when considering the points A, B and C (Figs. 3 and 6) whereof the first two are situated in the plane MM passing through the axis YY of the wheel 16 and parallel with the axis XX, and the third is situated in the plane NN passing through the axis YY and perpendicular to the axis XX:

(a) The slope 17 is at A when the hole 25 is at C, (b) The slope 18 is at A when the hole 27 is at C, (c) The slope 19 is at B when the hole 24 is at C, (d) The slope 18 is at B when the hole 23 is at C, (e) The notches 65 and 66 are at A and B, the wheel being in a position of dead centre, when the hole 26 is at C.

The wheel 16 can be brought into any one of the five positions abcde above mentioned, by a rotation on the axis YY by means of a mechanism under manual control. For this purpose, according to the form of construction represented, the wheel 16 which is keyed to the axle 15, loose in the support 13, is provided with teeth 28 connected by a gear-set 29, 30 to a last wheel 31 which is mounted, like the whole of this gearing in the support 13. This latter wheel 31 is in gear engagement, through an aperture formed in the tubular shaft 9, with a rack 32 which is slidable in this shaft 9. The rack is extended by a rod 33 (Figs. 1, 3, and 5) upon whose end is mounted a crank 34 (Fig. 1) connected, for instance, with an operating handle 35 mounted, for example, on the steering wheel of the vehicle. The said handle is movable upon a notched sector 37 or like member, by means of which the handle can be brought accurately into any one of the five positions corresponding to the positions a, b, c, d, e of the wheel 16 as above set forth.

The support member 13 is traversed, above the selecting wheel 16, by two shafts 38 and 39 which are parallel with the axis MM. Upon these shafts are pivotally mounted, bearing against the vertical sides qr and pn of the support 13, four dogs 40, 41, 42, 43 (Figs. 2, 3, 4 and 6), which are situated opposite each other in pairs, the pair 40, 41 being situated at one side of the axis NN and the pair 42, 43 at the other side of said axis. In side elevation the dogs have the form shown in Figs. 2 and 4. They each comprise an inclined face terminating in a rounded nose, the rounded noses of the dogs of one pair being turned toward each other. Springs 44 urge the said dogs in the direction in which their lower faces engage the upper face of the wheel 16.

In the support member 13 is pierced a hole 45 parallel with the axis YY and so situated that it is above the point C of the selecting wheel 16. In the said hole is slidable a locking rod 46 adapted to engage one of the holes 23 to 27 of the wheel 16 which at a given time is located at the point C. The said rod 46 is pivoted at 47 to a lever 48. Said lever is pivoted on one end to a support member 13, about the axle 38, and at its other end, about an axle 49, to a pair of links 50, which are in turn pivoted about an axle 51 to the casing 1. These connections are such that they permit, on the one hand, of withdrawing the lower end of the rod within the upper portion of the fork 14 when the support member 13 is in the lower or idle position (Fig. 4), and on the other hand, of causing this end to project downwardly out of the upper portion of said fork, when the support member 13 has turned upwardly (Fig. 2), while at the same time remaining compatible with the rotation of the support member 13 about the axis XX.

The mechanism further comprises two laterally-disposed levers 52—53 (Figs. 2 to 6) of right-angled form, which are pivoted, on the covers 2 of the casing 1, about journals 54, 55 whose axes are parallel with the axis XX. At their angles, each lever carries, on the side opposite the corresponding cover, a stud 56 or 57 having such a position that its axis will pass through the point A or B of the wheel 16 when the support member 13 has pivoted upwardly so as to bring the said wheel into the position shown in Figs. 2 and 3. At the upper rear ends of the levers 52, 53 are pivoted, on axles 58, 59, the links 60, 61 respectively (Figs. 1 and 3) which are pivoted at the other ends to the respective levers of the change-speed gear.

The disposition of this latter is such, for instance, that in order to obtain:

(a) The first speed, the link 60 should be moved in the direction of the arrow $f^a$ (Fig. 3), and the stud comes to the point $56^a$ (Fig. 2), (b) The reverse drive, the link 60 should be moved in the direction of the arrow $f^b$, and the stud 56 comes to the point $56^b$ (Fig. 3), (c) The second speed, the link 61 should be moved in the direction of the arrow $f^c$, and the stud 57 comes to $57^c$ (Fig. 3), (d) The third speed, the link 61 should be moved in the direction of the arrow $f^d$, and the stud 57 comes to $57^d$.

The operation is as follows. Let it be supposed that it is desired to obtain the first speed (a). The wheel 16 should be brought into the above mentioned position a with the slope 17 at the point A as shown in Fig. 6, the notch 20 being at the point B, and the hole 25 at C.

If the wheel 16 is not in this position, it is brought into it by the handle 35, which permits of moving the rack 32 in the desired direction, and the said rack acts upon the wheel 16 by means of the gearing 31, 30, 29, 28.

In order to obtain the first speed, the clutch pedal 10 is then pressed down. The tubular shaft 9 rotates in the direction of the arrow $f^1$, and the support member 13 turns in the same direction, from the position shown in Fig. 4 to the position shown in Fig. 2. At the beginning of this movement, the locking rod 46 is driven downwardly, and its lower end enters the hole 25 in the wheel 16, and it thus holds the said wheel against rotation.

During the upward movement, the inclined face of one of the four dogs 40, 41, 42 or 43 engages the stud 56 or 57, according to which one of the two levers 52 or 53 had been moved in order to obtain the preceding speed, and it thus brings back this lever into its mean position corresponding to the dead centre. At this time, both levers 52 and 53 will thus be at the dead centre.

However, as the upward movement of the support member 13 continues (the unclutching having been effected during the above-mentioned approaching stroke), the stud 56 of the lever 52 now meets the slope 17 of the selecting wheel 16, whilst the stud 57 of the lever 53 engages the groove 20 of the wheel 16. The slope 17 continues to rise into the position shown in Fig. 2, thus moving the stud 56 into the position $56^a$. The lever 52 turns about the axis 55, and the link 60 is moved in the direction of the arrow $f^a$, thus obtaining, in the change-speed gear, the combination corresponding to the first speed. During this whole operation, the wheel 16 cannot rotate, in spite of the reaction of the stud 56 upon this wheel, as the latter is held fast by the rod 46.

The driver, who has simply pressed upon the clutch pedal 10, has but to release this pedal, which returns into place by the effect of its reaction spring, not shown. The support member 13 is brought back at the same time to its initial position as shown in Fig. 4.

During the return stroke of the support member 13, the dog 40, under which the stud 56 is now situated, pivots freely about its axle 38 and the stud 56 remains in position. The spring 44 then returns the dog 40 into the position in which it engages wheel 16.

At the end of the return stroke, the rod 46 is automatically released from the wheel 16, and this latter may be brought into any one of its positions b, c, d or e above mentioned, in order to obtain any one of the other three speeds, or the dead centre. The stud 56 will be brought into its position corresponding to the dead centre during the next rising movement of the support member 13 if in the meantime the wheel 16 has been turned by means of the handle 35.

Obviously, the invention is not limited to the embodiment herein described and represented, which is given solely by way of example. It is evident, in particular, that the movements of oscillation of the support member 13 about its axis XX, and of the wheel 16 about its axis YY might be replaced by alternating movements of translation.

Having now described my invention what I claim as new and desire to secure by Letters Patent is:

1. A gear shifting mechanism comprising in combination a pair of gear shifting rods, a transverse stud operatively connected to each of said rods, a selecting wheel provided with a plurality of angularly spaced cam surfaces and an equal number of notches diametrically opposite to said cam surfaces, a support member rotatably supporting said selecting wheel, control means for giving to said selecting wheel different angular positions for each of which one of said cam surfaces is operatively engageable with one of said studs while the diametrically opposite notch provides for the free passage of the other stud, operating means for moving said support member to operatively engage the engageable cam surface and stud and returning means adapted to return said elements to their neutral position during the approaching stroke of said supporting member.

2. A combination as claimed in claim 1, in which said selecting wheel further comprises two diametrically opposite notches which, in a given angular position of said selecting wheel provide for a free passage of both of said studs, whereby no speed is thrown in for the said given position of the selecting wheel.

3. A gear shifting mechanism comprising in combination a pair of gear shifting elements, a selecting wheel provided with a plurality of angularly spaced cam surfaces, a support member rotatably supporting said selecting wheel, control means for giving to said selecting wheel different angular positions for each of which one of said cam surfaces is operatively engageable with one of said elements, operating means for moving said support member to engage the engageable cam surface and element so as to throw in the corresponding speed and returning means including cam members carried by said support member and adapted to engage said shifting elements during the approaching stroke of said support member towards said elements and to return said elements to their neutral position, said cam members being retractable during the return stroke of said support member.

4. A gear shifting mechanism comprising in combination a pair of gear shifting elements, a selecting wheel provided with a plurality of angularly spaced cam surfaces, a support member rotatably supporting said selecting wheel, control means for giving to said selecting wheel different angular positions for each of which one of said cam surfaces is operatively engageable with one of said elements, said control means including a gear train, a rack, the last pinion of said gear train being keyed to the shaft of said selecting wheel and the first pinion being in mesh with said rack, and means adapted to displace longitudinally said rack, operating means for moving said support member to engage the engageable cam surface and element so as to throw in the corresponding speed and returning means adapted to return said elements to their neutral position during the approaching stroke of said supporting member.

5. A gear shifting mechanism comprising in combination a pair of gear shifting elements, a selecting wheel provided with a plurality of angularly spaced cam surfaces and with a series of holes, a support member rotatably supporting said selecting wheel, control means for giving to said selecting wheel different angular positions for each of which one of said cam surfaces is operatively engageable with one of said elements, operating means for moving said support member to engage the engageable cam surface and element so as to throw in the corresponding speed, locking means including a pin slidable in a hole provided in said support member, one of said holes in said selecting wheel being adapted to register with said hole in said support member for each position of said selecting wheel corresponding to a given speed, said pin being adapted to engage the registering holes when said support member is displaced out of its idle position, thereby locking said selecting wheel, and returning means adapted to return said elements to their neutral position during the approaching stroke of said supporting member.

6. A gear shifting mechanism comprising in combination a pair of gear shifting elements, a selecting wheel provided with a plurality of angularly spaced cam surfaces, a hollow shaft adapted to be oscillated by a conventional clutch pedal, a support member keyed to said hollow shaft and rotatably supporting said selecting wheel, control means for giving to said selecting wheel different angular positions for each of which one of said cam surfaces is operatively engageable with one of said elements, said control means including a gear train, a rack slidable in said hollow shaft, the last pinion of said gear train being keyed to the shaft of said selecting wheel and the first pinion being in mesh with said rack, and means adapted to displace longitudinally said rack, operating means for moving said support member to engage the engageable cam surface and element so as to throw in the corresponding speed and returning means adapted to return said elements to their neutral position during the approaching stroke of said supporting member.

ROBERT LOUIS DELMAS.